56- HARVESTERS.

248

Sheet 1-2 Sheets.

C. Wheeler Jr.

Orig pat. 12,044

Mower.

No 875

Reissued Jan. 3, 1860.

Witnesses.
Th. G. Kuffman
L. Coker

Cyrenius Wheeler Jr

Sheet 2 - 2 Sheets.

C. Wheeler Jr.

Mower.

No. 875

Reissued Jan. 3, 1860.

Witnesses:
Th. Ruffermann
E. Cohen

Cyrenus Wheeler Jr

UNITED STATES PATENT OFFICE.

CYRENUS WHEELER, JR., OF POPLAR RIDGE, NEW YORK.

IMPROVEMENT IN GRAIN AND GRASS HARVESTERS.

Specification forming part of Letters Patent No. 12,044, dated December 5, 1854; Reissue No. 875, dated January 3, 1860.

DIVISION A.

*To all whom it may concern:*

Be it known that I, CYRENUS WHEELER, Jr., of Poplar Ridge, in the county of Cayuga and State of New York, have invented certain new and useful Improvements in Grain and Grass Harvesters; and I do hereby declare the following to be a full, clear, and exact description of the construction and operation of the same, reference being had to the accompanying drawings, making a part of this specification, in which—

Figure 1:
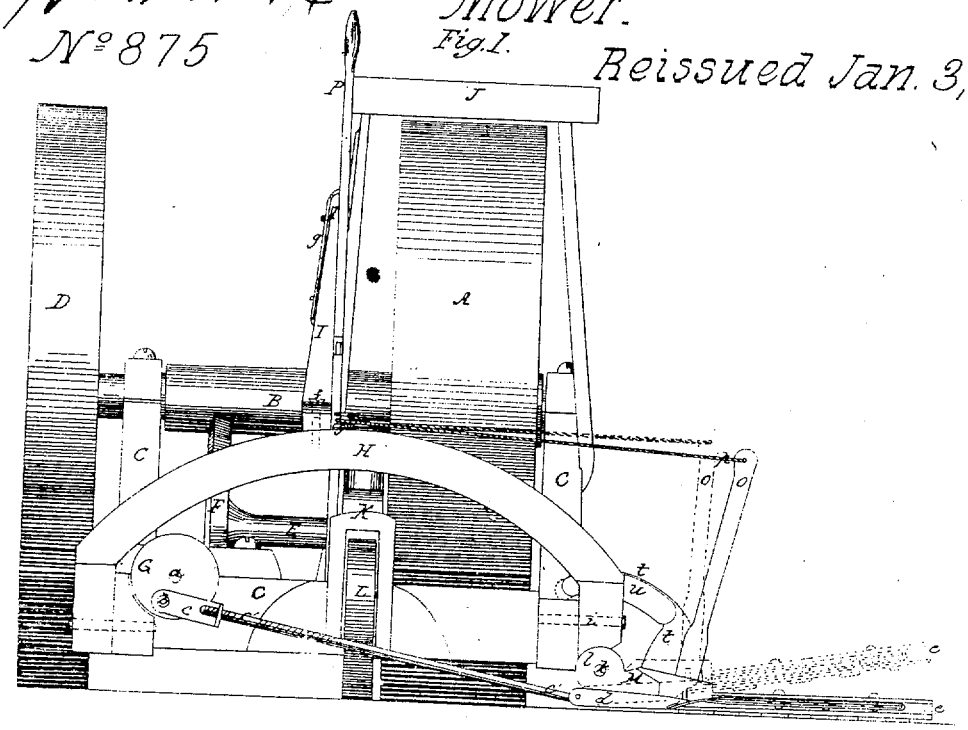
Figure 2:
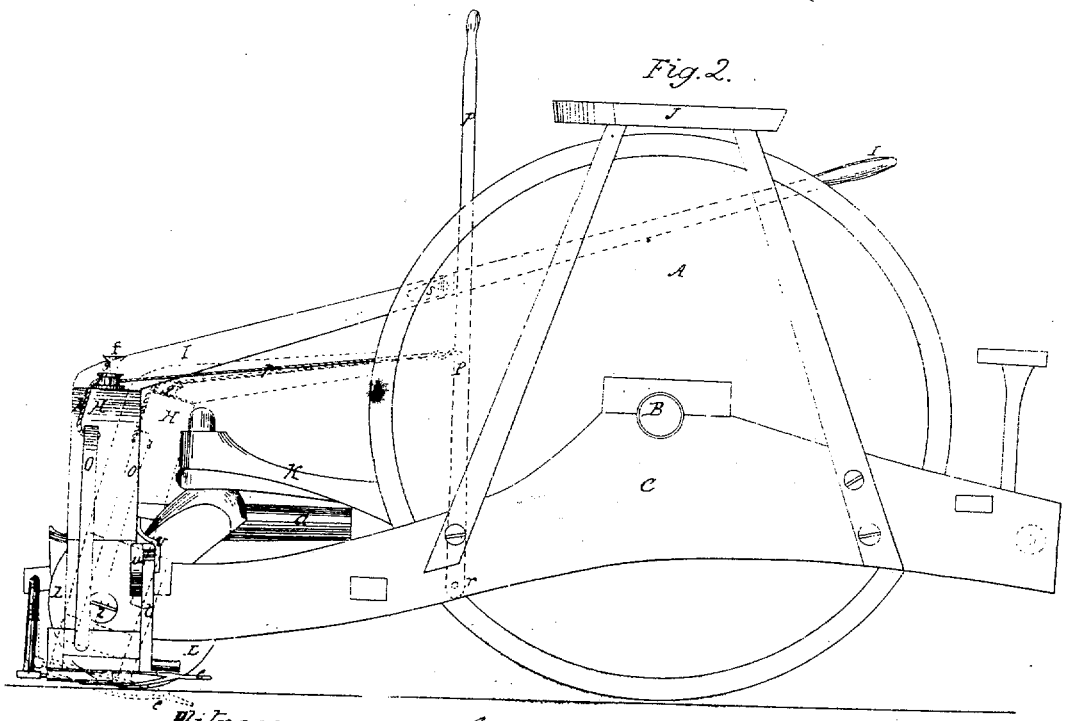
Figure 5:
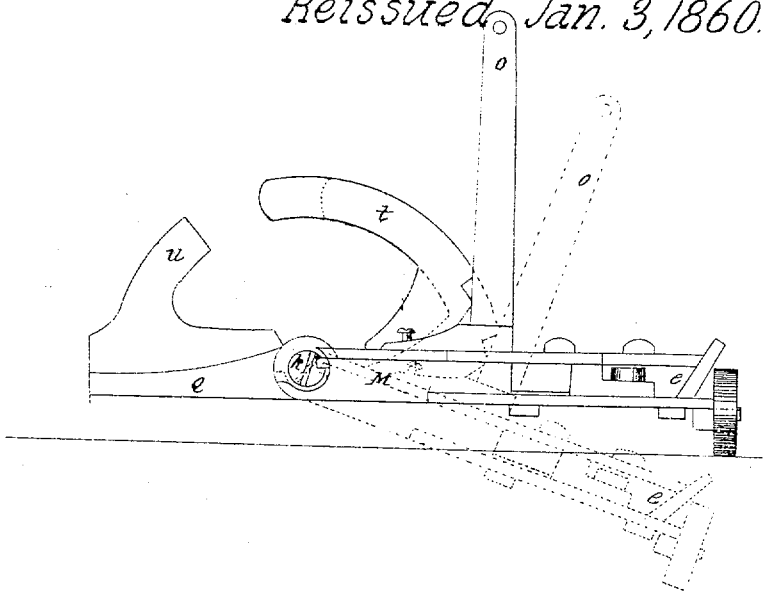
Figure 3:
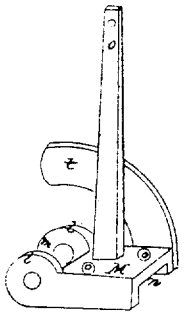
Figure 6:
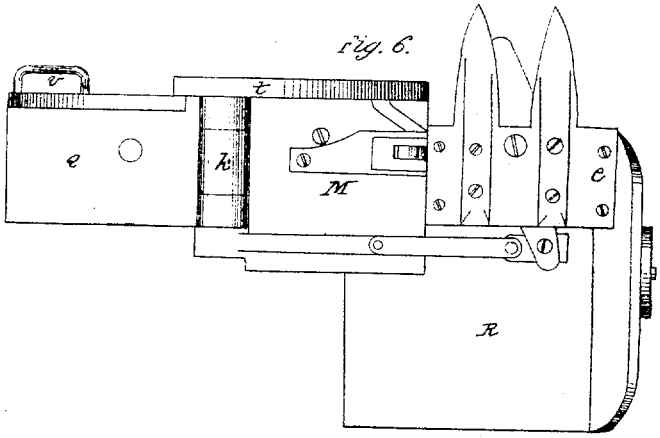
Figure 4:
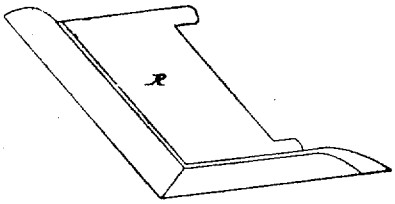
Figure 7:
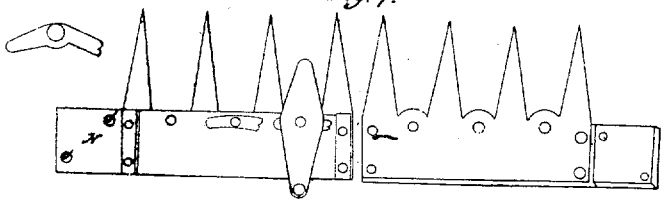

Figure 1 represents a rear elevation of the machine. Fig. 2 represents a side elevation of the same, taken from that side of the machine next the standing grain or grass. Fig. 3 represents in perspective a detached portion of the machine, which I term the "shoe" or "hinged support" for the cutter-bar. Fig. 4 represents the grain table or platform detached from the finger-bar. Fig. 5 represents the shoe or hinged support and the finger-bar connected to it. Fig. 6 represents a plan of the parts as represented in Fig. 5, both being on an enlarged scale. Fig. 7 represents a cutting apparatus.

Similar letters of reference, where they occur in the separate figures, denote like parts of the machine in all the figures.

In the construction of a grain and grass harvester known as a "combined reaper and mower" there are many essential features that must be adaptable to both reaping and mowing, the conditions of each operation varying with the material to be cut and the nature of the ground over which the machine is to be operated. In cutting grain the cutters are raised a considerable distance above the ground; but in this position they must be under the easy control of the driver or operator, while in cutting grass it is important that the cutters should run as close to the ground as possible, having due regard to their security from striking into or against any intervening obstacles.

To make a mowing-machine practical the cutter-bar should follow the undulations of the ground over which it passes without being influenced by the inequalities of the ground over which the wheel or wheels of the main frame may be passing, and to make it thus follow the undulations of the ground it should depend upon receiving all its vertical movements from the surface of the ground over which it is for the time being passing, while its forward movement only is controlled by the main frame.

To construct such a convertible machine as will adapt itself to both the cutting of grain and grass and be susceptible of the necessary adjustments for each separate purpose constitutes the general characteristics of this invention; and the manner in which the machine is constructed will be hereinafter fully set forth, first premising that there are certain principles or functions in the organization of the machine which form the subject-matter of separate applications for Letters Patent, while this application looks to the construction of the details or devices by which these more general principles are carried out and the manner in which I have combined and arranged them in one machine to effect the several purposes hereinafter mentioned.

A represents the main driving and supporting wheel, which is fast on the axle B, at or near one of its ends, and to which axle the main frame C is attached or suspended; and D is an additional supporting-wheel on the opposite end of said axle, and loose thereon, so as to turn independently of the axle. The main frame surrounds the main wheel A, while the auxiliary wheel D may be outside of said frame, as shown in Fig. 1. An internal gear on the rim of the main wheel takes into a pinion on the end of the shaft E, and thus gives motion to said shaft. On the opposite end of the shaft E from its pinion there is a bevel-gear, F, that takes into a bevel-pinion on the crank-shaft *a*, and thus gives motion to said crank-shaft and the crank-wheel G upon it. The main frame C droops toward its rear for the purpose of inclining the gearing, so that the crank or wrist pin *b* in the crank-wheel G shall be nearly in line with the cutter-bar—that is to say, as near to said line as practical without allowing the crank or its pitman to catch and wind upon themselves any stalks of grass or grain that they may come in contact with. The pitman is made in two pieces, *c c'*, the one, *c*, connected to the wrist-pin *b*, and the other, *c'*, to the cutter-bar *d*. The piece *c'* of the pitman is united to its fellow-piece *c* by a screw-thread for two purposes—first, that it may be properly adjusted to the length of stroke of the crank or wrist pin and prevent any backlash or lost motion; and, secondly, that the finger-bar *e*, which rocks or rolls on its longitudinal axis, may do so without torsion on the pitman, as the piece *c'*, instead of twisting by any such rocking of the finger-bar, simply makes a quarter or half turn by its screw-thread in the piece *c*, and thus there is no binding or cramping of the pitman or connecting-rod. The turning of the piece *c'* of course lengthens and shortens the pitman; but it is so inconsiderable as not in any wise to affect the free and easy movement of said pitman.

To the rear end of the main frame C there is pivoted a piece, H, which can freely move on its pivoted or hinged part; and to this piece H is connected, by a screw, *f*, or other detachable contrivance, one end of a lever, I, whose opposite end extends toward the driver's seat J, so that said driver, or the occupant of said seat, may conveniently seize and operate the lever as circumstances may require; and in close proximity to the driver's or conductor's seat there may be also a guide, *g'*, with stops or pins for allowing the end of the lever free vibration, or to hold or restrict it within certain limits. The rocking or moving of the piece H will vibrate the opposite end of the lever I which is connected to it; and so, also, will the operating of the extreme end of the lever move the piece H on its turning-points *i i*. The object in extending the piece H clear across from side piece to side piece of the frame is that it may serve as a cross-brace to the frame.

To the rear portion of the main frame is connected an arm, K, which carries a caster-wheel, L, by means of which said rear portion of the frame is mainly supported, and may be raised and held up, if desired. The piece H and the shoe or socket M connected to it are also supported and kept from pressing too hard upon the ground by the caster-wheel L, which may, by washers placed on its spindle, be made to support these parts at any given height. The shoe M is hinged to the piece H by a pivot-bolt, *k*, which stands at right angles to the pivots *i* of the brace, bar, or piece H, so that the shoe M, and consequently the finger-bar that is connected to it, as will be hereinafter explained, may have the motions incident to both the hinged or pivoted points *i* and *k*. The shoe M, as more distinctly seen at Fig. 3, has lugs *l l* and space *m* between them, into which the end of the hinged piece H passes, and by means of the pivot-bolt *k*, passing through their holes, the hinge is formed. It has also a socket or recess, *n*, made in it for receiving the end of the finger-bar N, Fig. 7, s[illegible] finger-bar being firmly bolted to said shoe by bolts passing through their respective holes *o o o' o'* therein.

To the shoe M is connected a post or arm, O, to the upper end of which is fastened a rope or chain, *p*, which passes around a friction-pulley, *g*, on the piece H, and thence to a lever, P, to which it is adjusted and fastened. The lever P is pivoted at *r* to the main frame and extends up to near the driver's or conductor's seat J, and in extending upward it passes the lever I, in contact with it, so that a stop or catch, *s*, on said lever I will stand behind the lever P and catch and release it in a manner to be presently described. There is also an arc or curved arm, *t*, on the shoe M, which, when the shoe is hinged to the piece H, laps by and rests against a similar arc or curved arm, *u*, on the piece H, and serves as braces to support the finger-bar when reaping, and a staple or guide, *v*, on the piece H may be further used to support these arms *t u*.

Of the platform or table R, Fig. 4, and of the cutting apparatus shown at Fig. 7, it is unnecessary to make any detailed description. Their duty is that of every platform and every cutting apparatus. It is proper to state, however, that I use a hinged tongue, so that no weight from the machine shall be on the horses' necks, and so that the machine, too, shall not be tipped up or drawn down as the horses pass over ridges or depressions in the ground, but follow the undulations thereof, uninfluenced by any other causes. The operation of these hinged connections is as follows: By moving the point of the lever I up and down, the piece H, shoe M, and the finger will oscillate around the pivots *i*, either into the position shown in red lines in Fig. 2, in which case the points of the fingers are thrown down toward the ground, as shown by red lines, or by a reverse movement raised up, and by allowing the lever a free range, or removing the screw *f*, the piece H, with its shoe and finger-bar attached, will take this rocking or rolling motion from the ground itself, thus accommodating the finger-bar to the undulating surface over which it passes.

By connecting the lever P to the arm O on the shoe M by the flexible connection *p* the driver, from his seat, can raise up the cutter-bar, as shown in Fig. 1, or let it down at pleasure, the length of the cord or chain *p* defining the distance below a horizontal line that said cutter-bar may fall; and besides this the bar may itself rise up and descend to the extent of this defined lower range by its own action, or in connection with the motions it receives from being drawn over the ground; or the cutter-bar may have the motions of both the hinged points *i k*, the one in line with the motion of the machine, the other at right angles thereto, for it will be peceived that by depressing the end of the lever I the stop *s* will take the lever P with it, and by reversing the lever I the piece H is thrown backward, and the weight of the finger-bar will cause the lever P to follow the stop *s*, and thus keep them together, though not attached to each other. When the point of the lever I is fastened the lever P may still be used for raising or lowering the finger-bar, as shown in Fig. 1 by red lines, or allowing it to drop below a horizontal line, as shown in blue lines, Fig. 5; and, as before stated, the bar H and shoe M, being supported and kept from pressing too hard upon the ground by the caster-wheel L, may, by washers placed on its spindle, be made to support the said bar and shoe, and consequently the finger and cutter bar connected with them, at any given height.

The arcs *t u* may be furnished with a pin or set-screw to hold or clamp them together, if it should at any time be necessary to do so either in operating the machine or in preparing it for being transported from place to place.

Having thus fully described the nature and object of my invention, what I claim under this patent is—

1. In combination with the hinged bar H and the finger-bar, the intermediate shoe, M, hinged to said bar H, substantially in the manner and for the purpose set forth.

2. In combination with the hinged bar H, a lever that, when released, allows said bar to freely swing around its pivoted points, and when fastened holds said bar firmly in its adjusted position, as described.

3. The shoe M as a hinge and a support both, to the cutter-bar, substantially as described.

4. The socket or recess *n* in the shoe M for the reception of the finger-bar, substantially as described.

5. In combination with a finger-bar hinged at one of its ends to an intermediate piece, also hinged to the main frame, an elevating and supporting caster-wheel for carrying that end of the machine when adjusted for reaping or mowing, substantially as described.

6. The combination of a brace or support, *t*, on the shoe, and a similar brace or support, *u*, on the bar H, for resisting the strain on the finger-bar when reaping, substantially as described, or for transporting it from place to place.

7. The flexible connection for elevating the outer end of the finger-bar, substantially as described.

CYRENUS WHEELER, JR.

Witnesses:

THOS. H. UPPERMAN,

E. COHEN.